Dec. 22, 1953     E. J. KELLY     2,663,474
OUTBOARD MOTOR CARRIER
Filed Nov. 15, 1952     3 Sheets-Sheet 1
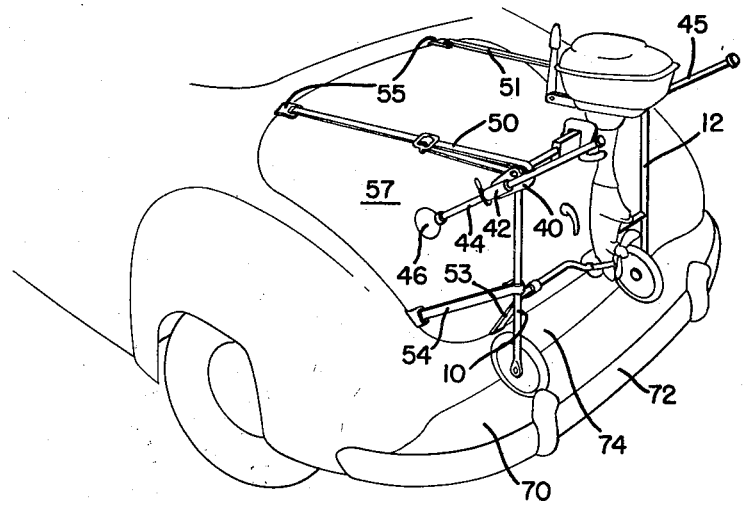
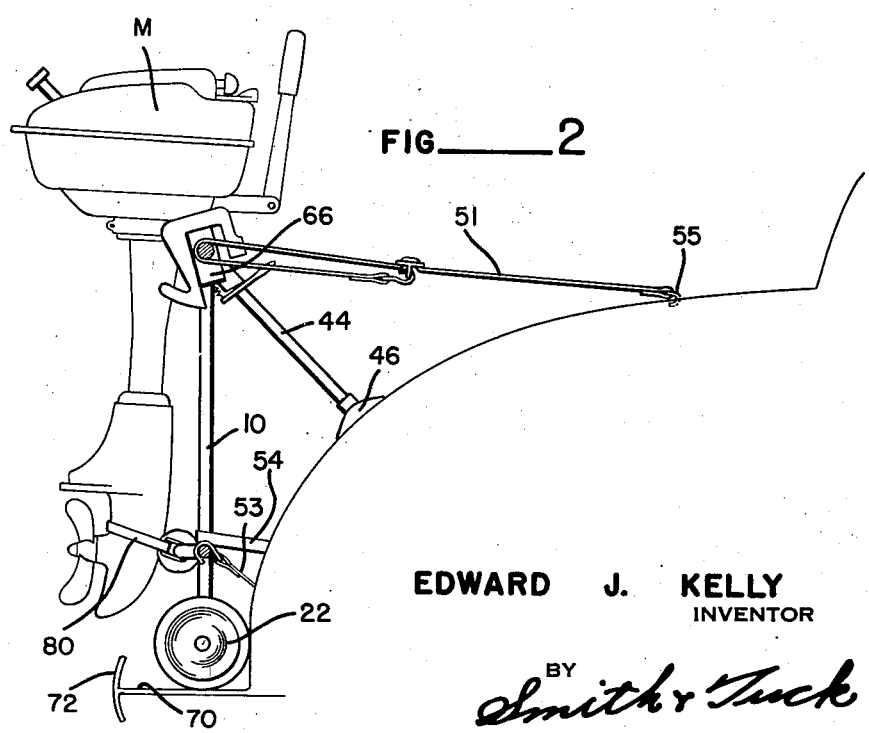
EDWARD J. KELLY
INVENTOR
BY *Smith & Tuck*

Dec. 22, 1953   E. J. KELLY   2,663,474
OUTBOARD MOTOR CARRIER
Filed Nov. 15, 1952   3 Sheets-Sheet 2
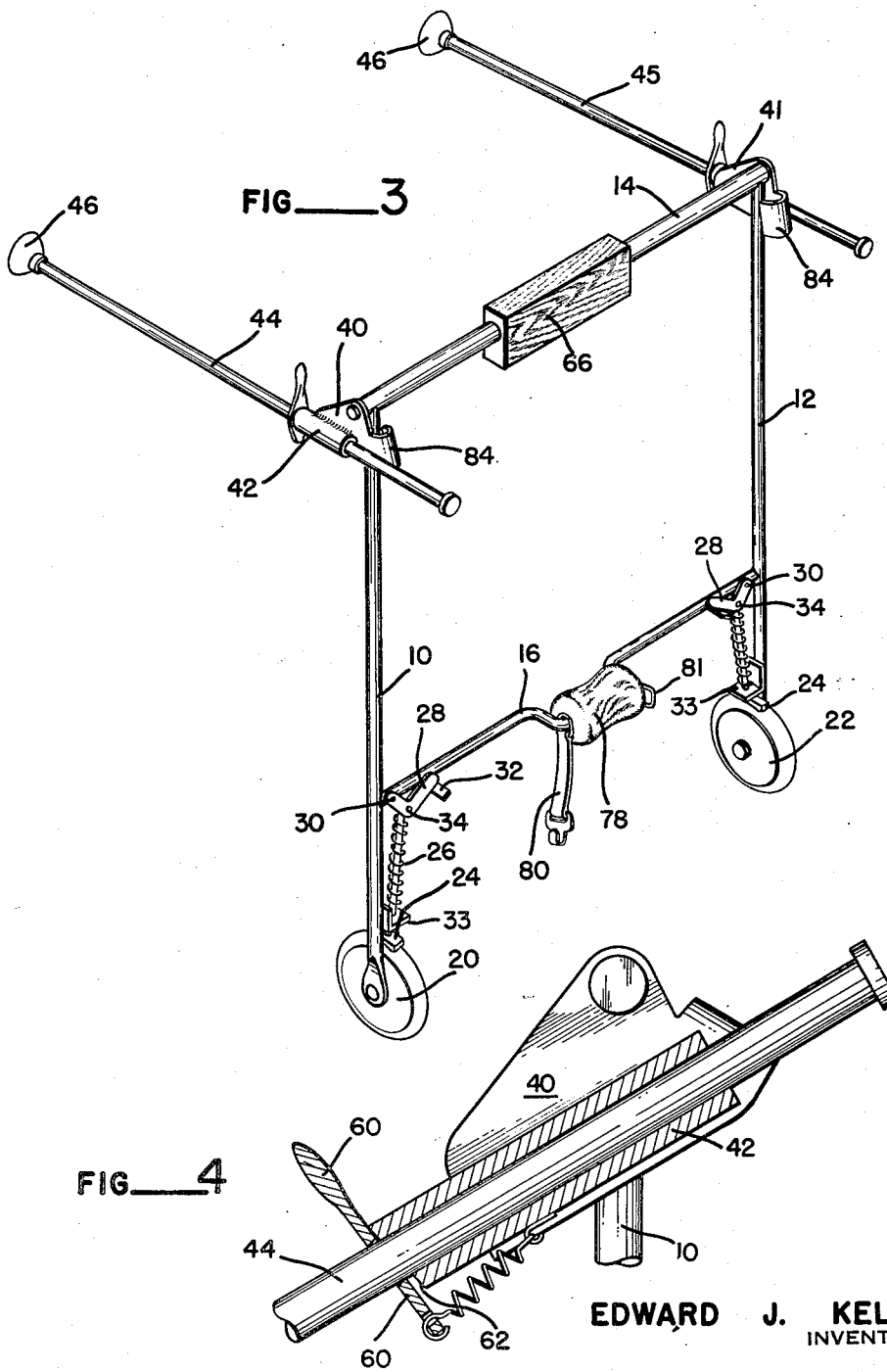
EDWARD J. KELLY
INVENTOR
BY Smith & Tuck

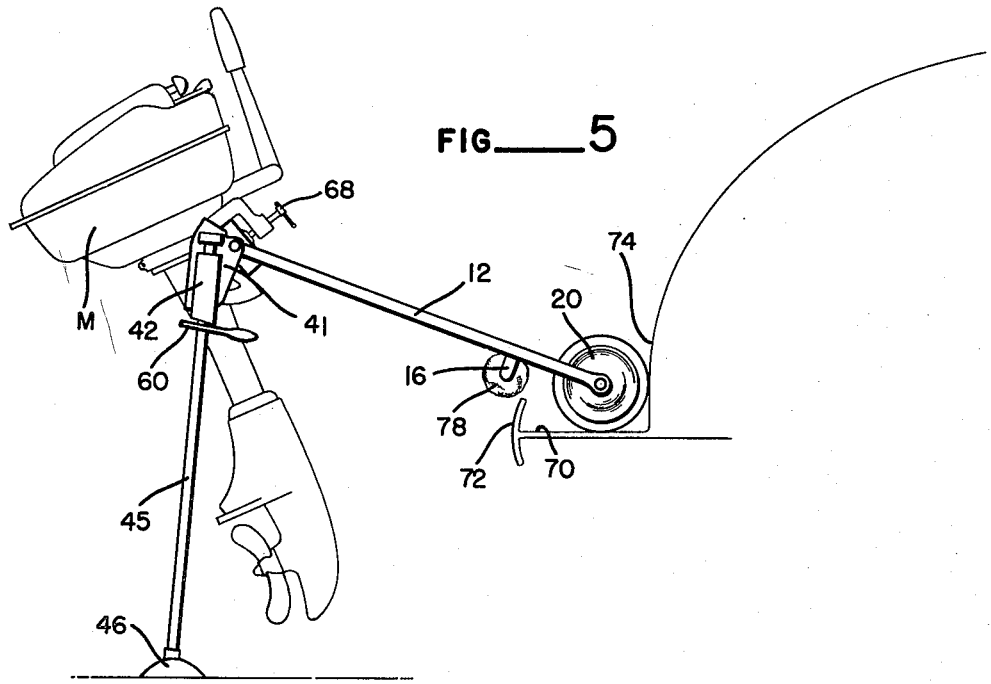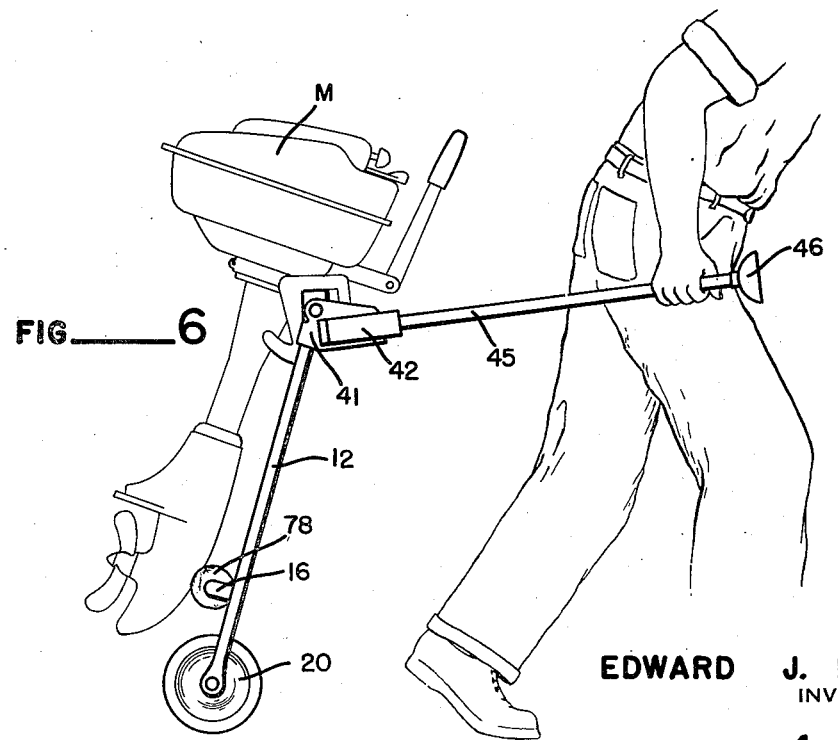

Patented Dec. 22, 1953

2,663,474

UNITED STATES PATENT OFFICE 2,663,474

OUTBOARD MOTOR CARRIER

Edward J. Kelly, Seattle, Wash.

Application November 15, 1952, Serial No. 320,780

5 Claims. (Cl. 224—42.03)

This present invention consists essentially of an adjustable framework, preferably formed of tubing, which supports and positions an outboard motor on the rear deck of an automobile. Means are provided so that the weight of the motor is largely carried on the bumper and bumper shield with adjustable straps to hold the motor in place by hooks engaging the deck cover or the frame surrounding the opening and having adjustable strut members arranged so that they provide a convenient and secure tightening means for the straps. When the frame is not used as a carrier, it may be, by adjustment, employed as a cart to wheel the motor about; and finally, the framework admits of adjustment so that it provides a convenient stand for the motor upon which it can be left during long periods of storage.

The outboard motor has always been a perplexing item to carry on an automobile. It is irregular in shape and it is very difficult to keep the motor from leaking oil or gasoline in any except a substantially upright position which is the normal position for the motor. Because of its propensity for leaking and giving out fumes, it is not practical to carry the motor inside the car and, for the same reason, it is rarely desirable to carry the same in the back luggage compartment because it is apt to contaminate any other items carried therein. In this present invention it is believed that a satisfactory solution has been made to this perplexing problem and one which has all around utility adding to both the convenience, safe-carrying, and storage of the motor.

The principal object of this present invention therefore is to provide an adjustable outboard motor carrier which can be easily and quickly attached or detached from the rear deck of an automobile and in which provision is made for the secure positioning of the motor, in any reasonable adjusted position on the back end of a car.

A further object of this invention is to provide a carrier which is sufficiently adaptable by adjustment so that it provides a cart for the movement of the outboard motor and may be likened to the ordinary golf cart.

A further object of this invention is to provide an adjustable carrier for an outboard motor which in turn can be suitably adjusted so that it will provide a storage rack upon which the motor can be left for long periods.

Further objects, advantages and capabilities will be apparent from the description and disclosure in the drawings, or may be comprehended or are inherent in the device.

In the drawings:

Figure 1 is a perspective view, showing in the fragmentary form the outline of the rear deck of an automobile with a preferred form of my carrier placed thereon;

Figure 2 is a side elevation of the device of Figure 1 with certain parts broken away and sectioned to better illustrate the structure;

Figure 3 is a perspective view illustrating the basic elements of my carrier;

Figure 4 is a fragmentary, sectional view showing the locking means for conveniently and securely locking the strut members in their adjusted positions;

Figure 5 illustrates the manner in which a heavy motor can most easily be removed, or secured to, an automobile; and Figure 6 is a side elevation illustrating the manner in which my car can be adapted as a cart for the transportation of an outboard motor by hand.

Referring more particularly to the disclosure in the drawings, the numerals 10 and 12 designate the two upright supporting bars or posts. These two posts are connected together near their tops as by welding by the upper connecting support bar 14, and the connecting rest bar 16, near the lower ends. This constitutes a framework that should be made of members sufficiently strong so that the frame will be rigid. This frame is made non-collapsible in order that it may be rigid to the extent that it will accept and prevent any side sway such as might occur on making curves, or due to normal road shocks when the device is in use. The lower extremities of posts 10 and 12 are provided with preferably rubber-tired wheels 20 and 22, these should be of a diameter to conform to the car apron with which the device is used. These wheels are suitably mounted on spindles secured to posts 10 and 12 and are intended to take the weight of the motor and framework when installed on a car in addition to their apparent use of wheeling the motor about, or serving as a stand for the motor. When mounted on a car, or when used as a stand, it is desirable to have means for locking wheels 20 and 22 against rotation. Such an arrangement is shown, consisting of the shoes 24 adapted to engage the tires under urgence of the compression springs 26. Pressure is placed upon shoes 24 by means of the toggle members 28 which are pivoted at 30 and are provided with the pressure pads 32. As illustrated in Figure 3, shoes 24 have been raised from the wheels and are held in the raised position by the compression springs 26, which abut plates 33 secured to posts 10 and 12, and which also act as a guide for the shoe shafts; these are pivotedly secured to members 28 at 34. When it is desired to lock wheels 20 and 22, pressure is applied to pad 32, as by the foot or hand, and pivot 34 swings past the center of the line connecting pivot 30 and the guide of shoe 24 so that the toggle lock is effected, and this is secured in position by the resiliency of the rubber tire on the wheel 20 or 22.

Pivotably secured at the upper limit of the main frame, preferably to the connecting bar 14, are the strut clamp housings 40 and 41. These housings are provided with suitable guideways 42 through which struts 44 and 45 may be slid into the desired position. At their extreme ends, struts 44 and 45 are provided preferably with relatively large vacuum cups 46. These serve as pads against the surface of the car deck after the showing of Figures 1 and 2 and by being vacuum cups, they can be definitely positioned and the suction will retain them in their adjusted contact positions.

It will be noted that the motor support device is secured to the car by a plurality of adjustable straps such as the upper straps 50 and 51, the lower straps 53 and 54, of which one of each may be employed on each side, being attached to the connecting rest bar 16. These straps terminate in preferably metal hook members 55, which are made of thin sheet stock and have fair width, in the neighborhood of an inch or so, in order that they may engage the cover 57 of the car trunk and still permit the trunk to be closed with the same in the joints. Normally on all cars there is ample room for these hook members, in that, in order to provide a watertight closure, the various doors or lids 57 seat on a relatively thick rubber or other resilient gasket and these are only slightly more compressed through the employment of hooks 55.

The various adjustable straps are normally adjusted to hold the support frame in approximately the desired position and are finally tightened by swinging the frame rearwardly revolving about wheels 20 and 22, and the straps are then held in the desired degree of tension by struts 44 and 45. To achieve this in a convenient manner, a device made after the showing of Figure 4 has been found very desirable. In this arrangement, a thin lock bar 60 is employed which encircles the strut, as 44, rather loosely, and locking is achieved by lock bar 60 being forced toward the sloping surface 62 of strut clamp housing 42 while contacting the housing 42 at only one point. When using this arrangement, the motor is clamped onto clamp block 66 by means of its normal transom clamps 68 and clamp block 66 is normally capable of some rotary movement on bar 14 which will permit the motor to swing in the position shown in Figure 5. In this instance, the strut members 44 and 45 are supporting the weight of the motor and the posts 10 and 12 are raised so that the wheels rest upon the apron 70, which on most cars is disposed between the bumper 72 and the rear of the car body 74. Motor M is then raised to the position in Figure 1 or 2 and the propeller assembly comes to rest upon the rest member 78 and is secured thereto by, preferably, a resilient strap 80 which is provided with a suitable hook for engagement in the D ring 81. The struts 44 and 45 would in this stage of the operation be pointed to the rear. They are then moved through the lower quadrant and normally slid up through the strut clamp 40 so that the vacuum cups 46 can be suitably positioned after the showing of Figures 1 and 2. The straps are then tightened, usually by grasping one strut as 44 and pulling outwardly on the carrier while pressing the strut down against the car deck. When sufficient tension has been placed upon the adjustable straps 50 and 53, pressure is released and the clamp bar 60 holds the strut in that adjusted position. The same procedure is undertaken with companion strut 45 and when both struts are then locked in position by their lock bars 60 with sufficient tension on the straps, a very secure engagement is effected which will permit the carrier to accept all normal load shocks and jolts.

When it is desired to take the motor off the car, the handles 61 of lock bars 60 are pressed toward the clamp, in this instance both can be operated normally at the same time, and this will permit the whole frame to be swung slightly forward, thus freeing straps 50, 51 and 53 from tension whereby they may be readily unhooked. If the struts are then swung to the position indicated in Figure 5, where they will again be locked against further movement by locking lever 60, then unloading is a mere reversal of the loading operation and can easily be effected by a single individual even when using the larger type of outboard motors which would be very difficult to manhandle in the ordinary fashion. With the motor freed from the car, the weight can then be shifted to the wheels 20 and 22 and their companion posts, 10 and 12. The struts 44 and 45 can then be swung to an adjusted position where the hook-like clamp members 84 are brought into engagement with posts 10 and 12 and in this manner a two-handled cart, which may be used after the showing of Figure 6, is provided. This has proved to be a great convenience in handling the outboard motors which in recent years have been growing larger and heavier due principally to the fact that the larger motors can be now throttled to the slow trolling speed. Consequently larger motors are more generally used because of their inherent capability in getting the fisherman or the sportsman quickly to his intended location.

It is believed it will be clearly apparent from the above description and the disclosure in the drawings that the invention comprehends a novel construction of an outboard motor carrier.

Having thus disclosed the invention, I claim:

1. In a carrier for transporting an outboard motor on an automobile of the type having a frame including two spaced upright supporting arms having their upper portions secured together by a support bar adapted to be secured in the clamp of the motor, the improvement, comprising: a pair of struts each having a suction cup at one end and a pair of strut housings in which the struts are slidably mounted and releasable securing means for clamping the struts in place in their housings to change their effective length, said strut housings being secured to the upper portion of said frame at either side in a manner permitting the struts to extend laterally forward from the supporting arms; upper and lower adjustable length tension members each having one end secured to said frame at upper and lower locations respectively and each a hook at its other end adapted to fasten to the edges of the trunk door of such automobile, whereby said carrier may be secured with said frame upright and resting on the bumper apron of the automobile and with the suction cups pressed against the trunk door by the tension members.

2. The subject matter of claim 1 in which there is a wheel mounted on the lower end of each supporting arm disposed to rotate in an upright plane and said struts have such length when fully extended to permit manual pulling of the carrier on the ground.

3. The subject matter of claim 2 in which said wheels have rubber tires and a brake for each wheel having an upright compression member having a shoe on its lower end disposed to bear on the tire and having a spring connected thereto disposed to normally bias the shoe from contact with the tire and a toggle joint connected to the frame and to the upright compression member operative to lock the shoe against the tire.

4. The subject matter of claim 1 in which a block is mounted on said support bar pivotal relative said supporting arms to be clamped by the motor clamp, a cross member joining the lower portions of said supporting arms having a U-shaped bend in its central portion and a padded rest member positioned on said bend and including strap means operative to secure the propeller shaft housing of the motor to said rest member.

5. The subject matter of claim 1 in which said strut housings are pivotally mounted on said frame permitting pivoting of each strut in an upright plane and stop means on said strut housings and frame limiting forward pivoting of the struts upward of a point a short distance above normal to said supporting arms and supporting wheel means mounted on the lower end of said frame.

EDWARD J. KELLY.

References Cited in the file of this patent

UNITED STATES PATENTS

| Number | Name | Date |
|---|---|---|
| 1,733,479 | White | Oct. 29, 1929 |
| 1,747,600 | Reardon | Feb. 18, 1930 |
| 1,799,650 | Schoenburg | Apr. 7, 1931 |
| 2,429,551 | Hitzemann | Oct. 21, 1947 |
| 2,439,707 | Wright | Apr. 13, 1948 |
| 2,484,227 | Honk et al. | Oct. 11, 1949 |
| 2,596,860 | McCrory et al. | May 13, 1952 |
| 2,621,836 | McMiller | Dec. 16, 1952 |